(12) United States Patent
Imagawa et al.

(10) Patent No.: US 7,816,820 B2
(45) Date of Patent: Oct. 19, 2010

(54) COMPACTED MAGNETIC CORE WITH HIGH RESISTANCE, MANUFACTURING METHOD THEREOF, AND MOTOR FOR ELECTRIC CAR

(75) Inventors: Takao Imagawa, Mito (JP); Yuichi Satsu, Hitachi (JP); Matahiro Komuro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 11/924,779

(22) Filed: Oct. 26, 2007

(65) Prior Publication Data
US 2008/0100154 A1 May 1, 2008

(30) Foreign Application Priority Data
Oct. 27, 2006 (JP) .............................. 2006-292632

(51) Int. Cl.
*H02K 15/12* (2006.01)
*H02K 21/12* (2006.01)

(52) U.S. Cl. .............................. 310/44; 310/45; 310/46; 310/156.45

(58) Field of Classification Search .................. 310/44, 310/45–46, 156.43; 148/513
See application file for complete search history.

(56) References Cited

U.S. PATENT DOCUMENTS 2,864,734 A * 12/1958 Adams ........................ 148/306

2006/0022175 A1 * 2/2006 Komuro et al. ............. 252/500

FOREIGN PATENT DOCUMENTS

| JP | 09170001 A | * | 6/1997 |
| JP | 10-154613 | | 6/1998 |
| JP | 10312927 A | * | 11/1998 |
| JP | 2003-332116 | | 11/2003 |
| JP | 2004-288983 | | 10/2004 |
| JP | 2006-041203 | | 2/2006 |
| JP | 2006041203 A | * | 2/2006 |

OTHER PUBLICATIONS

Machine Translation JP2006041203 (2006), JP09170001(1997), JP10312927(1998).*

* cited by examiner

*Primary Examiner*—Quyen Leung
*Assistant Examiner*—Jose A Gonzalez Quinones
(74) *Attorney, Agent, or Firm*—Antonelli, Terry, Stout & Kraus, LLP.

(57) ABSTRACT

A compacted magnetic core with a high resistance, which comprises compacted magnetic powder of an iron powder or an alloy powder containing iron as a main ingredient and a layer of a rare earth metal fluoride or an alkaline earth metal fluoride on the surface of the powder, wherein the rare earth metal fluoride or the alkaline earth metal fluoride contains fluorine-depleted crystal lattice at a rate of 10% or less.

21 Claims, 5 Drawing Sheets

COMPACTED MAGNETIC CORE WITH HIGH RESISTANCE, MANUFACTURING METHOD THEREOF, AND MOTOR FOR ELECTRIC CAR

CLAIM OF PRIORITY

The present application claims priority from Japanese application serial No. 2006-292632, filed on Oct. 27, 2007, the content of which is hereby incorporated by reference into this application.

FIELD OF THE INVENTION

The present invention concerns a compacted powder magnetic core manufactured by compacting molding of a magnetic powder containing an iron element and it particularly relates to a compacted powder magnetic core suitable for use in parts of electric machines such as rotary electric machines and reactors, and a manufacturing method of them.

BACKGROUND OF THE INVENTION

In recent years, electric cars have attracted attention in view of the environmental problems. An electric car has a rotary electric machine (motor) as a power source and a smoothing transformer (reactor), for an inverter circuit output, and improvement has been demanded for the efficiency of such parts. Magnetic cores used for the parts described above are required to have low iron loss and high magnetic flux density, as well as that magnetic properties thereof are not lowered in a region from low frequency to high frequency.

The iron loss includes an eddy current loss (We) greatly concerned with the specific resistance of the magnetic core and a hysteresis loss undergoing the effect of strains in the iron powder caused from the manufacturing process of the iron powder and the subsequent process hysteresis. The iron loss (W) can be shown by the sum for the eddy current loss (We) and the hysteresis loss (Wh) as shown in the following formula. In the formula, f represents a frequency, Bm represents an exciting field magnetic flux density, $\rho$ represents a specific resistance, t represents the thickness of a material, and $k_1$ and $k_2$ each represents a coefficient.

$$W = We + Wh = (k_1 Bm^2 t^2/\rho) f^2 + k_2 Bm^{1.6} f$$

As apparent from the formula, since the eddy current loss (We) increases in proportion with the square of the frequency f, suppression for the eddy current loss is essential for not lowering the magnetic property, particularly, at high frequency. For suppressing the generation of the eddy current in the compacted powder magnetic core, it is necessary to optimize the size of the magnetic powder used, form an insulation layer on the surface of individual magnetic powder, and use a compacted powder magnetic core formed by compacting molding using such magnetic powder.

In the compacted powder magnetic core, in a case where the insulation is insufficient, the specific resistance $\rho$ lowers to increase the eddy current loss. On the other hand, in a case where the thickness of the layer or film is increased for improving the insulation property, the ratio of the volume of the soft magnetic powder in the magnetic core is decreased to lower the magnetic flux density. For improving the magnetic flux density, in a case where the density of the soft magnetic powder is increased by conducting compacting molding of the soft magnetic powder at a high pressure, strain of the soft magnetic powder during molding is inevitable to increase the hysteresis loss (Wh) to result in a difficulty for the suppression of the iron loss (W). Since the eddy current loss (We) is low, particularly, in a low frequency region, the effect of the hysteresis loss (Wh) in the iron loss (W) increases.

In view of the problems described above, it has been proposed a method of forming an insulative layer on the surface of soft magnetic powdery particles by mixing a soft magnetic powder and an insulative particle such as of titania, silica or alumina (for example, refer to JP-A No. 2003-332116 (in claims)). Further, it has been proposed a method of manufacturing a compacted powder magnetic core by forming an insulation layer such as an oxide film or phosphate salt film on the surface of an Fe—Si type soft magnetic powder by way of compacting molding (for example, refer to JP-A No. 2004-288983 (in claims)). Further, it has been proposed a method of obtaining a high resistance by coating a phosphate salt in a liquid form and fixing the same by a post treatment (for example, refer to JP No. 3475041 (in claim 1)).

However, any of the methods described above involves a drawback that the occupation ratio of the iron powder particle is lowered by a binder and the magnetic flux density is not increased. Further, for removing strains, while the compacted powder magnetic core is applied with annealing at a temperature of 600° C. or higher after molding, in a case of forming an insulation layer by using phosphorous or oxygen, film forming elements diffuse in iron or form compounds with iron during annealing to possibly result in destruction of the insulation layer or degradation of the magnetic property.

In view of the above, a method of forming a fluoride film on the surface of the soft magnetic powder has been proposed (for example, refer to JP-A No. 2006-41203 (abstract)).

Rare earth metal fluorides or alkaline earth metal fluorides are excellent in the heat resistance, less reactive with iron, and are extremely suitable as an insulation layer material for the compacted powder magnetic core. The method of forming the fluoride film on the surface of the soft magnetic powder also has an advantage capable of obtaining high resistance without a binder. Further, by the use of a gas atomized powder or an indefinite powder for the soft magnetic powder, improvement for the specific resistance and the high magnetic flux density can be attained.

However, in a case of applying a compacted powder magnetic core formed with a film of a rare earth metal fluoride or an alkaline earth metal fluoride to various kinds of motor yokes, it has been found that no predetermined performance can be provided. Specifically, compacted powder magnetic cores sometimes resulted in unexpected lowering of the efficiency when operated at a high number of rotation or applied to large-sized electric motors.

This is because conditions for operating the compacted powder magnetic core at a good efficiency change depending on the shape and the number of rotation of rotary machines to be applied, or the operation frequency and the shape of reactors to be applied. The specific resistance $\rho(\Omega \cdot m)$, the thickness t (m), the magnetic material permeability $\mu$, frequency f (Hz), and the thickness S (m) undergoing the skin effect are in a relation shown by the following formula and the magnetic body is not operated at a thickness exceeding the thickness S (m) undergoing the skin effect, which is considered as a loss.

$$S = \sqrt{(2\rho/2\pi f \mu)}$$

For example, at an operation frequency of the rotary machine of 400 Hz, a magnetic permeability of 500, and a thickness as 5 mm, $\rho$ is $2 \times 10^{-3}$ $\Omega \cdot$cm and a higher specific resistance is necessary.

The compacted powder magnetic core manufactured by the method described in JP-A No. 2006-41203 cannot yet be considered sufficient in view of the specific resistance.

Patent document No. 1: Japanese patent laid-open 2003-332116

Patent document No. 2: Japanese patent laid-open 2004-288983

Patent document No. 3: Japanese patent No. 3475041

Patent document No. 1: Japanese patent laid-open 2006-41203

SUMMARY OF THE INVENTION

The present invention aims at increasing the resistance value and make low loss and high resistance compatible in a compacted powder magnetic core having a fluoride film.

The present invention provides, in one aspect, a high resistance compacted powder magnetic core in which a rare earth metal fluoride film or an alkaline earth metal fluoride film with a ratio of fluorine-depleted crystal lattice of 10% or less is formed on the surface of an iron powder or an alloy powder comprising iron as a main ingredient.

The present invention provides, in another aspect, a method of manufacturing a compacted powder magnetic core including a fluoride coating treatment step of forming a film comprising a rare earth metal fluoride or an alkaline earth metal fluoride to the surface of an iron powder or an alloy powder comprising iron as a main ingredient, a subsequent preliminary heat treatment step, a compacting molding step, and a strain removing heat treatment step.

The present invention provides, in still another aspect, a soft magnetic core having, as a magnetic core, a magnetic material having a film comprising a rare earth metal fluoride or an alkaline earth metal fluoride with a ratio of fluorine-depleted crystal lattice of 10% or less on the surface of an iron powder or an alloy powder comprising iron as a main ingredient.

The present invention provides, in still further aspect, a motor for driving an electric car having a soft magnetic core in which the soft magnetic core has, as a magnetic core, a magnetic material having a film comprising a rare earth metal fluoride or an alkaline earth metal fluoride to the surface of an iron powder or an alloy powder comprising iron as a main ingredient, and the rare earth metal fluoride or the alkaline earth metal fluoride has a ratio of fluorine-depleted crystal lattice of 10% or less.

By applying the preliminary heat treatment step after the fluoride coating treatment and before the compacting molding step, the specific resistance can be improved. Thus, the compacted powder magnetic core can be applied to a use at high frequency, or to large-sized rotary machines and the low loss and the high resistance can be made compatible.

DETAILED DESCRIPTION OF THE DRAWINGS

DETAILED DESCRIPTION OF THE PREFERRED EMBODIMENTS

According to the invention, in a case of manufacturing a core of 40 mm thickness by using a compacted powder molding product having an insulation film of an average thickness of 50 to 200 nm and a density of 7.5 g/cm$^3$, as an example, characteristics having a hysteresis loss $Wh_{1T/400\ Hz}$ of 15 W/kg or less, a specific resistance of 15 μΩ·m or higher, an eddy current loss $We_{1T/400\ Hz}$ of 15 W/kg or less, and an iron loss $W_{1T/400}$ Hz of 30 W/kg or less can be obtained under the condition at a preliminary heat treatment temperature of 600° C. and a strain removing heat treatment temperature of 600° C.

The compacted powder magnetic core of the invention has a film of a rare earth metal fluoride or an alkaline earth metal fluoride on the surface of an iron type powder. The fluorine compounds do not easily diffuse to a material showing ferromagnetic property at a room temperature such as iron or cobalt. Accordingly, they do not impair the high saturation magnetic flux density inherent to the magnetic material such as iron or cobalt. Further, since the fluoro compounds described above are insulators, they can increase the resistance of the molding product when formed to the surface of the iron type powder. High resistance is effective for the decrease of the eddy current loss. As the magnetic powder, while iron type or cobalt type magnetic powder may be considered, the iron type material having high saturation magnetic flux density, with less coercivity and hysteresis, and inexpensive in the cost is preferred in view of the soft magnetic material used for magnetic circuits. The iron alloy includes, for example, alloys of iron and cobalt. Further, for the powder, it is preferred to use a gas atomized powder or a granulated powder.

The coating treatment of the fluoride to the surface of the iron powder or the alloy powder comprising iron as the main ingredient can be conducted, for example, by mixing a solution in which a fluoride is formed with an iron or iron alloy powder, applying a heat treatment under a reduced pressure and removing a solvent or water of hydration. The heating temperature is preferably from 250 to 350° C.

Figure 1:
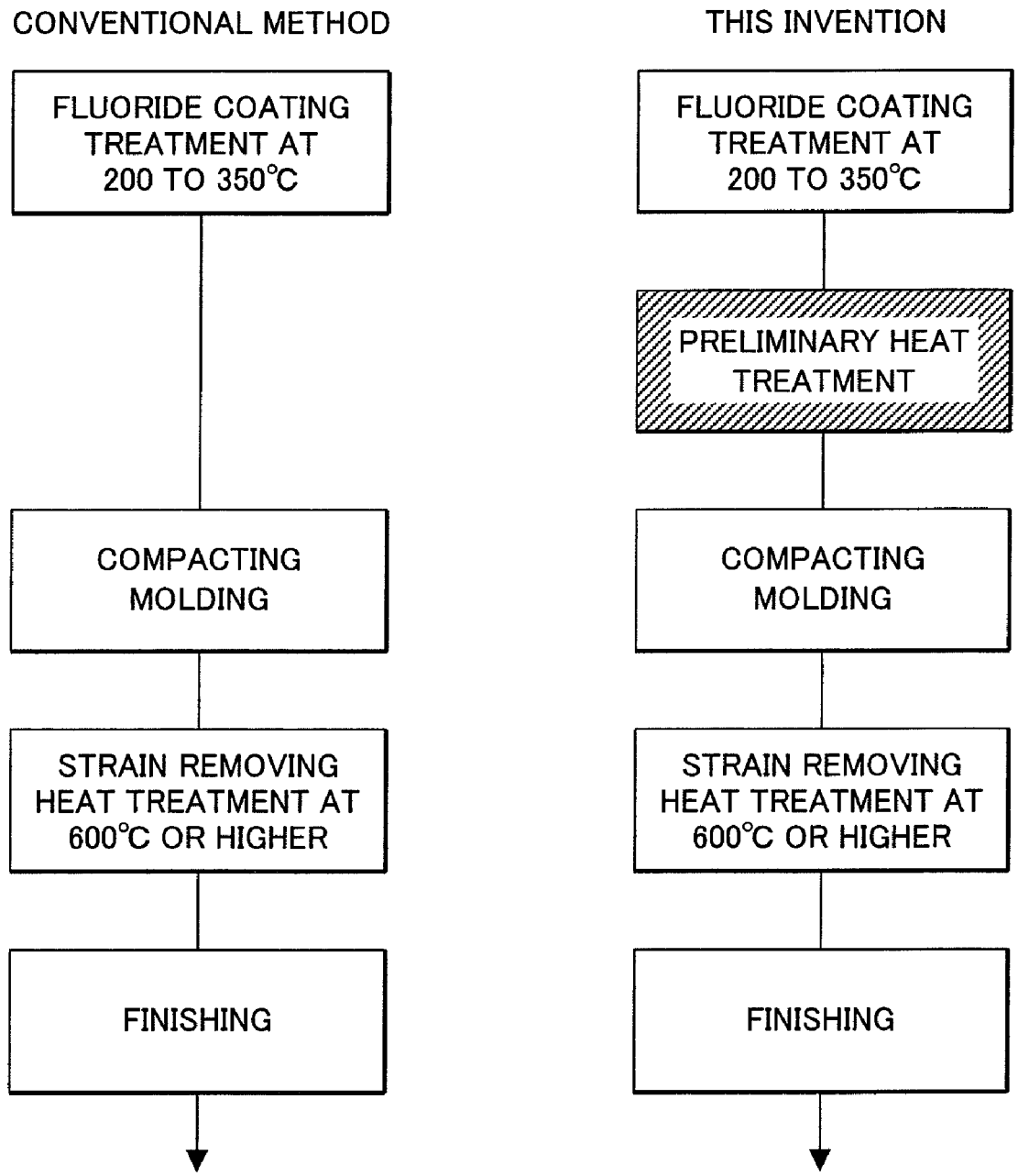
FIG. 1 is a step chart showing a step of manufacturing a compacted powder magnetic core according to an embodiment of the invention in comparison with that for a conventional method.

Then, the effect of the preliminary heat treatment is to be described. FIG. 1 shows manufacturing steps of the invention in comparison with a conventional method. The conventional method is a method described in JP-A No. 2006-41203. The invention includes coating a fluoride to a gas atomized powder or granulated iron powder, applying a heat treatment at 200 to 350° C., then applying a preliminary heat treatment and, subsequently, applying compacting molding to form a molding product, and then applying a strain removing heat treatment for removing strains caused by compacting to form a compacted powder magnetic core.

Figure 2:
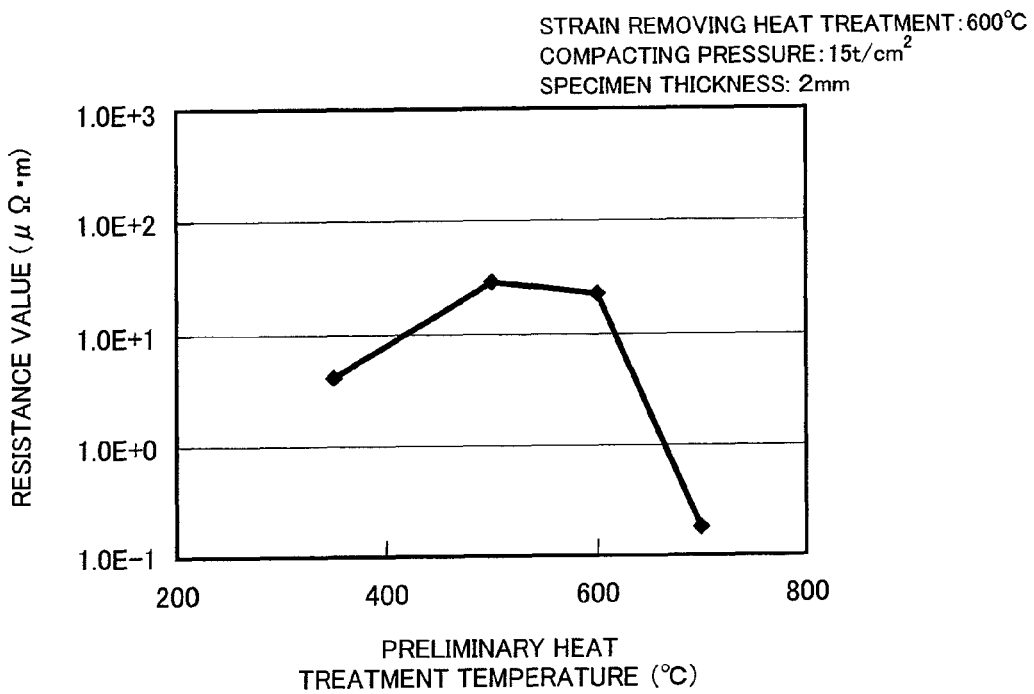
FIG. 2 is a characteristic view showing a relation between a preliminary heat treatment temperature and a specific resistance value.

FIG. 2 shows a relation between a preliminary heat treatment temperature and a specific resistance value at a heating temperature upon fluoride coating of 350° C., a compacting pressure during compacting molding of 15 t/cm$^2$, and a strain removing heat treatment temperature of 600° C. For forming a molding product at a high density, the compacting pressure was set to 15 t/cm$^2$, which was approximate to the upper limit for the manufacturing condition. NdF$_3$ was used as the fluoride. While the specific resistance was 8 μΩ·m for the product without the preliminary heat treatment, the specific resistance was 30 μΩ·m and 20 μΩ·m for the products applied with the preliminary heat treatment at 500° C. and 600° C., in which the specific resistance increased more compared with a case without the preliminary heat treatment.

On the other hand, the specific resistance was lowered for the product applied with the preliminary heat treatment at 700° C. than that at 350° C. Thus, it was found that the preliminary heat treatment at a temperature higher than the stress removing heat treatment temperature had no effect for increasing the specific resistance. Further, it was found from FIG. 2 that the preliminary heat treatment was preferably conducted within a range from the temperature identical to the stress removing heat treatment temperature to a temperature lower by 100° C. than that. The preliminary heat treatment may be applied by once cooling the sample after the fluoride coating treatment and then heating the same again after taking out from the furnace, or the preliminary heat treatment may be conducted continuously without cooling and taking out the sample. In a case of applying the preliminary heat treatment without cooling and taking out the sample, it provides an advantage that the preliminary heat treatment can be completed in a short time.

Figure 3:
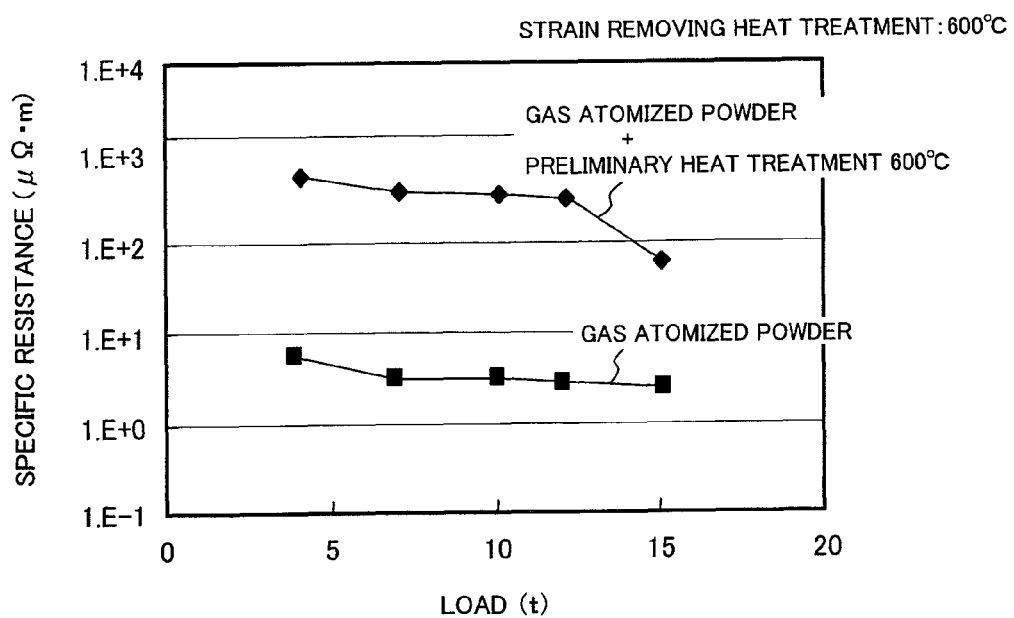
FIG. 3 is a characteristic view showing a relation between a compacting load and a specific resistance.

FIG. 3 shows a relation between a compacting pressure and a specific resistance for a compacted powder magnetic core manufactured by coating $NdF_3$ to a gas atomized powder, applying a heat treatment at 350° C., then applying a preliminary heat treatment at a temperature of 600° C., conducting compacting molding, and then applying a strain removing heat treatment at a temperature of 600° C. For the comparison, a relation between the compacting pressure and the specific resistance is shown also on a compacted powder magnetic core not applied with the preliminary heat treatment. In a case of not applying the preliminary heat treatment, specific resistance has no compacting pressure dependence but the specific resistance increased to 200 μΩ·m or higher at a compacting pressure of 12 t/cm² or lower in a case of applying the preliminary heat treatment and a remarkable increase in the resistance value was observed. In a case where the resistance increases by the lowering of the compacting pressure, the density of the magnetic core may possibly be lowered due to insufficient compression thereof. Then, the molding pressure and the shape of the magnetic core sample were compared.

Figure 4:
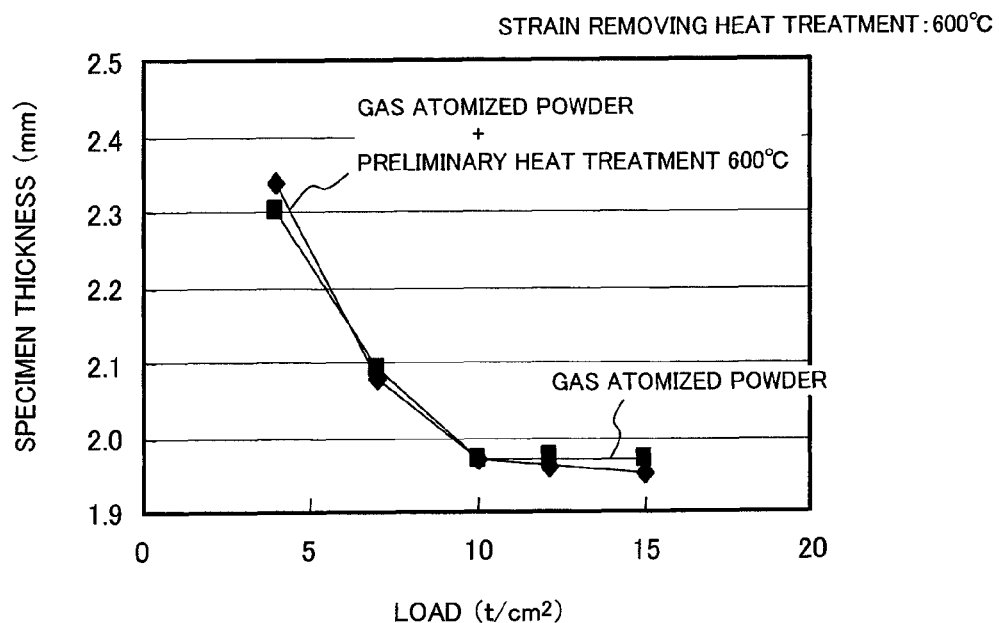
FIG. 4 is a characteristic view showing a relation between a compacting load and a sample thickness.

FIG. 4 shows the thickness of a square columnar sample obtained upon compression 1.5 g of a starting magnetic powder by using a compacting molded sample of 10 mm square, together with the compacting pressure. The compacted powder magnetic core attains a generally aimed density of 7.5 g/cm² or higher at a thickness of the sample of 2 mm or less. This is satisfied by a compacting pressure of 9 t/cm² or higher. From the results of FIG. 3 and FIG. 4, it was found that the optimal compacting pressure was from 9 t/cm² to 12 t/cm².

Figure 5:
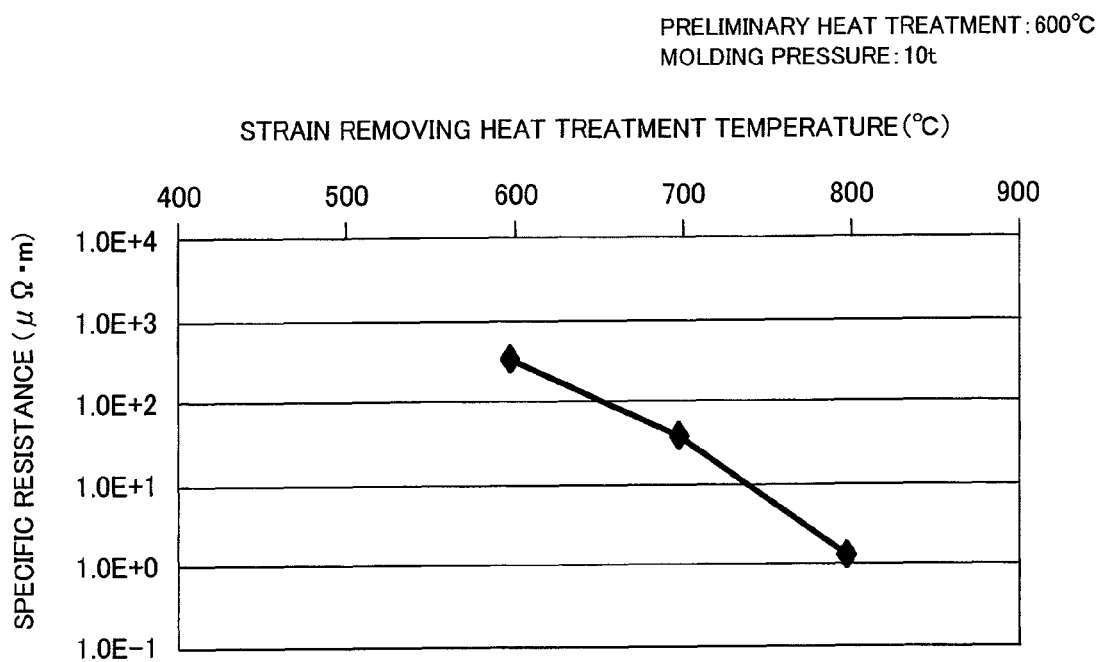
FIG. 5 is a characteristic view showing a relation between a strain removing heat treatment temperature and a specific resistance value.

FIG. 5 shows the specific resistance of the magnetic core formed by coating $NdF_3$ to a gas atomized powder, applying a preliminary heat treatment at 600° C., conducting pressure molding and then applying a strain removing heat treatment at a temperature from 600 to 800° C. It can be seen that the strain removing heat treatment temperature is preferably from 600 to 700° C. and the specific resistance lowers remarkably when the temperature exceeds 700° C. From the result, it was found that the strain removing heat treatment is preferably conducted at a temperature within a range from the temperature identical with the preliminary heat treatment temperature to a temperature higher by 100° C. than that.

Figure 6:
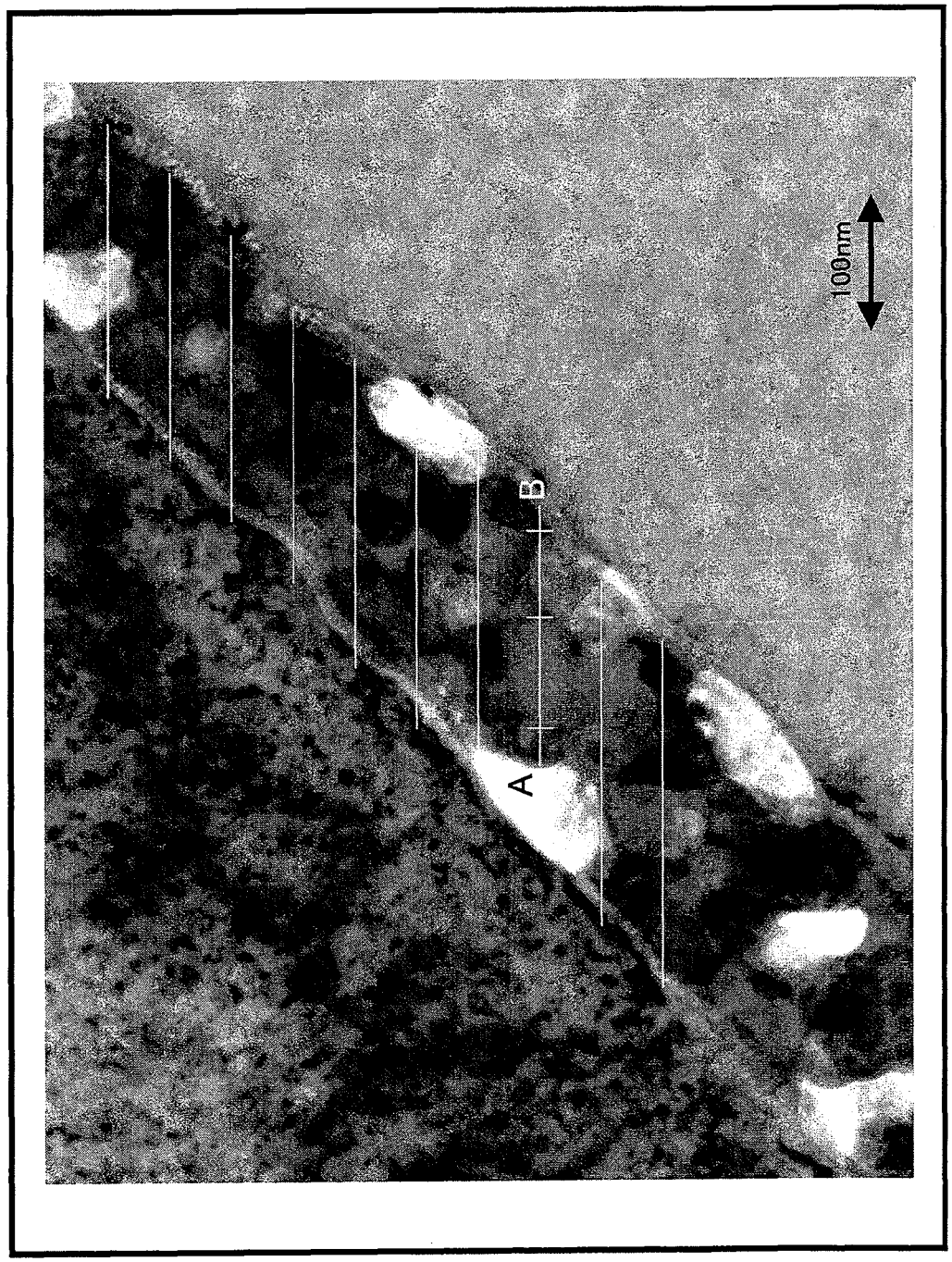
FIG. 6 is a view showing the method of calculating grain size based on a cross sectional TEM tissue.

For analyzing the mechanism for the increase in the resistance upon applying the preliminary heat treatment, a cross sectional TEM observation was conducted. Then it was confirmed that the grain size of the fluoride was changed. FIG. 6 shows a method of calculating the grain size. As shown in FIG. 6, lines are drawn each at an equal distance on cross sectional TEM images, and portions where lines and grain boundaries intersect are marked. For example, four intersections are present in the line for a segment AB. The length for the segment is calculated based on the scale ratio as 173 nm, which is divided by the number three for the intersections to obtain an average grain size of 58 nm. The procedure is repeated for 10 segments within a view field to determine an average value.

Figure 7:
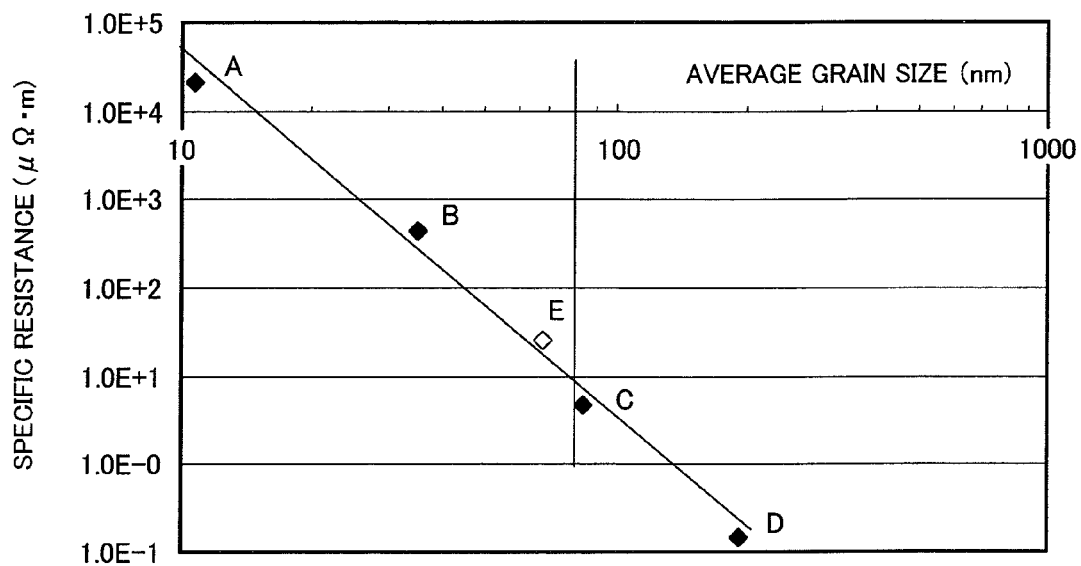
FIG. 7 is a characteristic view showing a relation between an NdF$_3$ grain size and a specific resistance value.

FIG. 7 shows a relation between a specific resistance and an $NdF_3$ grain size obtained in accordance with the method shown in FIG. 6 under TEM observation for samples A manufactured by compacting molding at 15 t an iron powder formed by coating $NdF_3$ to a gas atomized powder and applying a heat treatment at 350° C., that, a sample A without applying the preliminary heat treatment and the strain removing heat treatment, samples B, C, and D without applying the preliminary heat treatment but applying the strain removing heat treatment after the compacting molding, and sample E by applying the preliminary heat treatment and the strain removing heat treatment both at 600° C. The strain removing heat treatment temperature is 350° C. for B, 600° C. for C, and 800° C. for D. It can be seen that the resistance value for the molding product lowers as the $NdF_3$ grain size increases in any of the samples A to D not applied with the preliminary heat treatment. The sample E applied with the preliminary heat treatment at 600° C. (grain size: 68 nm) showed a result that the $NdF_3$ grain size was smaller and the resistance value was higher than those of the sample C (grain size 84 nm) applied with the strain removing heat treatment also at a temperature of 600° C. Thus, it was found that the preliminary heat treatment had an effect of refining the $NdF_3$ grain size and, as a result, increasing the resistance value. Further, for ensuring a particularly effective specific resistance: $1 \times 10^1$ μΩ·m as the rotary machine, the $NdF_3$ average grain size is preferably 80 nm or less.

For the sample applied with the preliminary heat treatment and the sample not applied with the preliminary heat treatment, the crystal structure of the fluoride was examined. As a result, it was found that $NdF_2$ and $NdF_3$ were observed in the crystal structure of the fluoride and they were mixed at a ratio of about 50:50 in a case without a preliminary heat treatment. On the contrary, it was found that $NdF_2$ was not recognized in the sample applied with the preliminary heat treatment, but the fluoride was formed entirely or substantially entirely into $NdF_3$. That is, in the samples applied with the preliminary heat treatment, the fluorine-depleted crystal lattice was not present or the rate thereof was extremely small and, as a result, the specific resistance was increased. It is considered that the effect of increasing the specific resistance can be provided in a case where the rate of the fluorine-depleted crystal lattice is 10% or less. More preferably, the rare earth metal fluoride or the alkaline earth metal layer should be free from depleted fluorine crystal lattice.

Description is to be made to a rotary machine using the compacted powder magnetic core of the invention for the magnetic core of a stator. The sample was manufactured by way of a fluoride treating liquid preparing step and a sample manufacturing step as described below.

[Preparation Step for Fluoride Coating Treatment Liquid]
(1) 4 g of Nd-acetate as a salt of a high solubility to water was introduced into 100 mL of water and dissolved completely by using a shaker or an ultrasonic stirring device.
(2) A hydrofluoric acid diluted to 10% was gradually added by an equivalent amount for a chemical reaction to form $NdF_3$.
(3) A solution in which $NdF_3$ in a sol-like precipitation was formed was stirred for 1 hour or more by using an ultrasonic stirrer.

(4) After centrifugal separation at a number of rotation of 4,000 to 6,000 rpm, supernatants were removed and methanol substantially identical therewith was added.
(5) After stirring the methanol solution containing sol-like $NdF_3$ completely into a liquid suspension, it was stirred for one hour or more by using an ultrasonic stirrer.
(6) The procedures (4) and (5) were repeated for 3 to 10 times till anions such as acetate ions or nitrate ions were no more detected.
(7) The solution was finally formed into sol-like $NdF_3$. A methanol solution with $NdF_3$ at 1 g/4 mL was used as a treating solution.

[Sample Manufacturing Step]
(1) 8 mL of an $NdF_3$ treating solution was added to 40 g of gas atomized iron powder of 100 μm grain size and mixed till wetting of the entire iron powder could be confirmed.
(2) Methanol as the solvent was removed under a reduced pressure of 2 to 5 torr from the $NdF_3$ treated iron powder in (1) above.
(3) The iron powder after removing the solvent in (2) above was transferred to a quartz boat and applied with a heat treatment at a reduced pressure of $5\times10^{-5}$ torr at 200° C. for 30 min and at 350° C. for 30 min to prepare a starting iron powder.
(4) The iron powder obtained in (3) above was applied with a preliminary heat treatment at 600° C.
(5) The iron powder heat treated in (4) above was molded by compacting molding by using a super-hard die into a ring-like sample of 18 mm outer diameter and 10 mm inner diameter. The compacting pressure was 10 t/cm². The sample was used for magnetic measurement of magnetic flux density and coercivity.
(6) A cuboidal sample was manufactured by compaction from the iron powder formed in (4) above using die of 10×10 mm. The compacting pressure was 10 t/cm². This sample was used for measuring the resistance value.
(7) The iron powder obtained in (4) above was placed in a compacting die for manufacturing a stator and compacted at a molding pressure of 10 t/cm². It was heat treated at 600° C. together with the samples obtained in (5), (6) above, to relive the strains.
(8) Windings were applied to the stator obtained in (7) above to manufacture a rotary machine.

Embodiment 1

Figure 8:
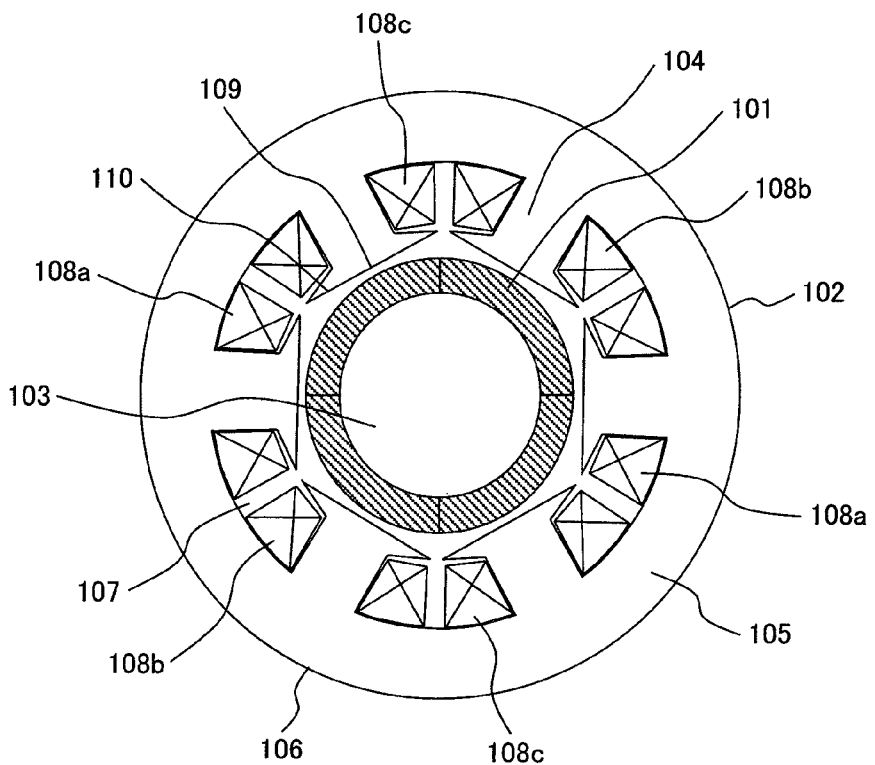
FIG. 8 is a cross sectional view of a rotary machine having a stator using the compacted powder magnetic core according to the embodiment of the invention.

FIG. 8 shows a radial cross sectional shape of a rotary machine having a stator using an iron powder formed with an $NdF_3$ layer according to the invention. The stator 102 of the rotary machine included a stator core 106 having teeth 104 and a core back 105, and concentrated armature windings (comprising U phase windings 108a, V phase windings 108b and W phase windings 108c of 3-phase windings), which were wound so as to surround the teeth 104 in the slot 107 between the teeth 104. Since the rotary machine in FIG. 8 had 4-pole and 6 slots, the slot pitch is 120° as an electric angle. A rotor was inserted into a shaft hole 109 or a rotor insertion hole 110, and a permanent magnet 101 was disposed to the outer peripheral surface of a rotor shaft 103. For the stator 102, an Fe powder formed with an $NdF_3$ film at 50 nm thickness and compacting molded at 10 t/cm² after a preliminary heat treatment at 600° C., and then applied with a strain removing heat treatment at 600° C. was used. The saturation magnetic flux density of the compacted powder magnetic core was 1.95 T at the occupation ratio of 90%.

In a case where the core thickness was set to 20 mm in order to obtain a high torque, a driving current was insufficient because of increase in the coil temperature by the heat generation for the magnetic core when the preliminary heating treatment was not applied. On the other hand, generation of heat was lowered by 30° C. and, as a result, torque was increased by 30% when the preliminary heat treatment was applied.

Embodiment 2

A stator of an identical cross section with that in FIG. 8 was manufactured at a thickness of 10 mm. In this case, the difference of the temperature increase was about 10° C. and the difference of the torque was 5% or less between a case with the preliminary heat treatment and a case with no preliminary heat treatment.

Since the saturation magnetic flux density of the molded iron power product applied with the $NdF_3$ coating treatment was substantially equal with the value for a silicon steel sheet, there was no problem of magnetic saturation.

The compacted powder magnetic core is used for the stator, because the motor has a multi-pole structure and it is essential for decreasing the eddy current generated by rotational magnetic fields. The rotor was a permanent magnet type rotor which was constituted by molding a powder material and the molded body has a bond magnet portion mainly comprising a binder and a magnet powder and a soft magnetic part mainly comprising a binder and a soft magnetic powder, and formed by using compacting molding means. The bond magnet part is mechanically bonded at least one surface of a magnetic pole to the soft magnetic part. Further, the bond magnet is manufactured on every segment by provisional molding, anisotropy was provided during the provisional molding, and the provisional molded body provided with the anisotropy was molded as a rotor having plural poles by molding to obtain the rotor. Then, a rotor for use in a motor of a structure magnetized by a magnetizing magnetic field is obtained.

The invention can be utilized as to a core part of small hysteresis loss or eddy current loss, a core for use in a motor requiring high magnetic flux density, a core part for solenoid core (stator core) and plunger for use in solenoid valves assembled in an electronic control type fuel injection devices of a diesel engines and gasoline engines, as well as a core part for various kinds of actuators. Further, it is also applicable to a core for use in various types of reactors.

What is claimed is:

1. A high resistance compacted magnetic core with a high resistance, which comprises compacted magnetic powder of an iron powder or an alloy powder containing iron as a main ingredient and a layer of a rare earth metal fluoride or an alkaline earth metal fluoride on the surface of the powder, wherein the rare earth metal fluoride or the alkaline earth metal fluoride contains fluorine-depleted crystal lattice at a rate of 10% or less.

2. A high resistance compacted magnetic core according to claim 1, wherein a main part of the rare earth metal fluoride or the alkaline earth metal fluoride is constituted by fluorine depletion free crystal lattice.

3. A high resistance compacted powder magnetic core according to claim 1, wherein the layer of the rare earth metal fluoride or the alkaline earth metal fluoride is coated on the surface of the iron powder or alloy powder containing iron as a main ingredient, followed by heat treatment and compacting the powder, a strain being removed by heat treatment.

4. A method of manufacturing a compacted magnetic core, which comprises:
forming a layer comprising a rare earth metal fluoride or an alkaline earth metal fluoride on the surface of an iron powder or an alloy powder containing iron as a main ingredient;
compacting the powder to produce a compacted molding;
heat-treating the compacted molding, and subjecting the heat-treated molding to a preliminary heat-treatment after the layer of the fluoride coating and before the compacting the powder.

5. A method of manufacturing a compacted magnetic core according to claim 4, wherein the preliminary heat treatment is conducted within a temperature range from substantially the same temperature as that for the strain removing heat treatment to a temperature lower by 100° C. than the above temperature.

6. A method of manufacturing a compacted magnetic core according to claim 4, wherein the strain removing heat treatment is conducted within a range of temperature from 600° C. to 700° C.

7. A method of manufacturing a compacted powder magnetic core according to claim 4, wherein the preliminary heat treatment is conducted without cooling after coating the fluoride layer.

8. A method of manufacturing a compacted magnetic core according to claim 4, wherein the compacting the powder is conducted at a compacting pressure of from 9 to 12 t/cm$^2$.

9. A method of manufacturing a compacted magnetic core according to claim 4, wherein after coating the rare earth metal fluoride or the alkaline earth metal fluoride on the surface of the iron powder or the alloy powder, the preliminary heat treatment is applied within a temperature range from substantially the same temperature as that for the strain removing heat treatment to a temperature lower by 100° C. than the preliminary heat treatment, and, after compacting molding, the strain removing heat treatment is conducted at a temperature from 600 to 700° C.

10. A soft magnetic core comprising a magnetic core of a magnetic material having a layer comprising a rare earth metal fluoride or an alkaline earth metal fluoride on the surface of an iron powder or an alloy powder comprising iron as a main ingredient, wherein the rare earth metal fluoride or the alkaline earth metal fluoride comprises fluorine-depleted crystal lattice at a rate of 10% or less.

11. A motor for driving an electric car comprising a soft magnetic core of a magnetic material powder having a layer containing a rare earth metal fluoride or an alkaline earth metal fluoride on the surface of the powder of iron or an alloy containing iron as a main ingredient, and the rare earth metal fluoride or the alkaline earth metal fluoride has a fluorine-depleted crystal lattice at a rate of 10% or less.

12. A motor for driving an electric car according to claim 11, wherein an average grain size of the crystal grains of the fluoride in the layer is 80 nm or less.

13. A method of manufacturing a compacted magnetic core according to claim 4, wherein the preliminary heat treatment is conducted within a range of 500° C. to 600° C.

14. A method of manufacturing a compacted magnetic core according to claim 6, wherein the preliminary heat treatment is conducted within a range of 500° C. to 600° C.

15. A compacted magnetic core manufactured by the method of claim 4, wherein the rare earth metal fluoride or the alkaline earth metal fluoride contains fluorine-depleted crystal lattice at a rate of 10% or less.

16. A compacted magnetic core manufactured by the method of claim 13, wherein the rare earth metal fluoride or the alkaline earth metal fluoride contains fluorine-depleted crystal lattice at a rate of 10% or less.

17. A compacted magnetic core manufactured by the method of claim 14, wherein the rare earth metal fluoride or the alkaline earth metal fluoride contains fluorine-depleted crystal lattice at a rate of 10% or less.

18. A compacted magnetic core according to claim 15, wherein the layer of the rare earth metal fluoride or the alkaline earth metal fluoride is a layer of the rare earth metal fluoride.

19. A compacted magnetic core according to claim 15, wherein the layer of the rare earth metal fluoride or the alkaline earth metal fluoride is a layer of the alkaline earth metal fluoride.

20. A high resistance compacted magnetic core with a high resistance of claim 1, wherein the layer of the rare earth metal fluoride or the alkaline earth metal fluoride is a layer of the rare earth metal fluoride.

21. A high resistance compacted magnetic core with a high resistance of claim 1, wherein the layer of the rare earth metal fluoride or the alkaline earth metal fluoride is a layer of the alkaline earth metal fluoride.

* * * * *